Nov. 27, 1934.  R. A. TRUEMAN  1,982,086
NONSPLASH SPRAYING GUARD
Filed Nov. 2, 1933  3 Sheets-Sheet 3
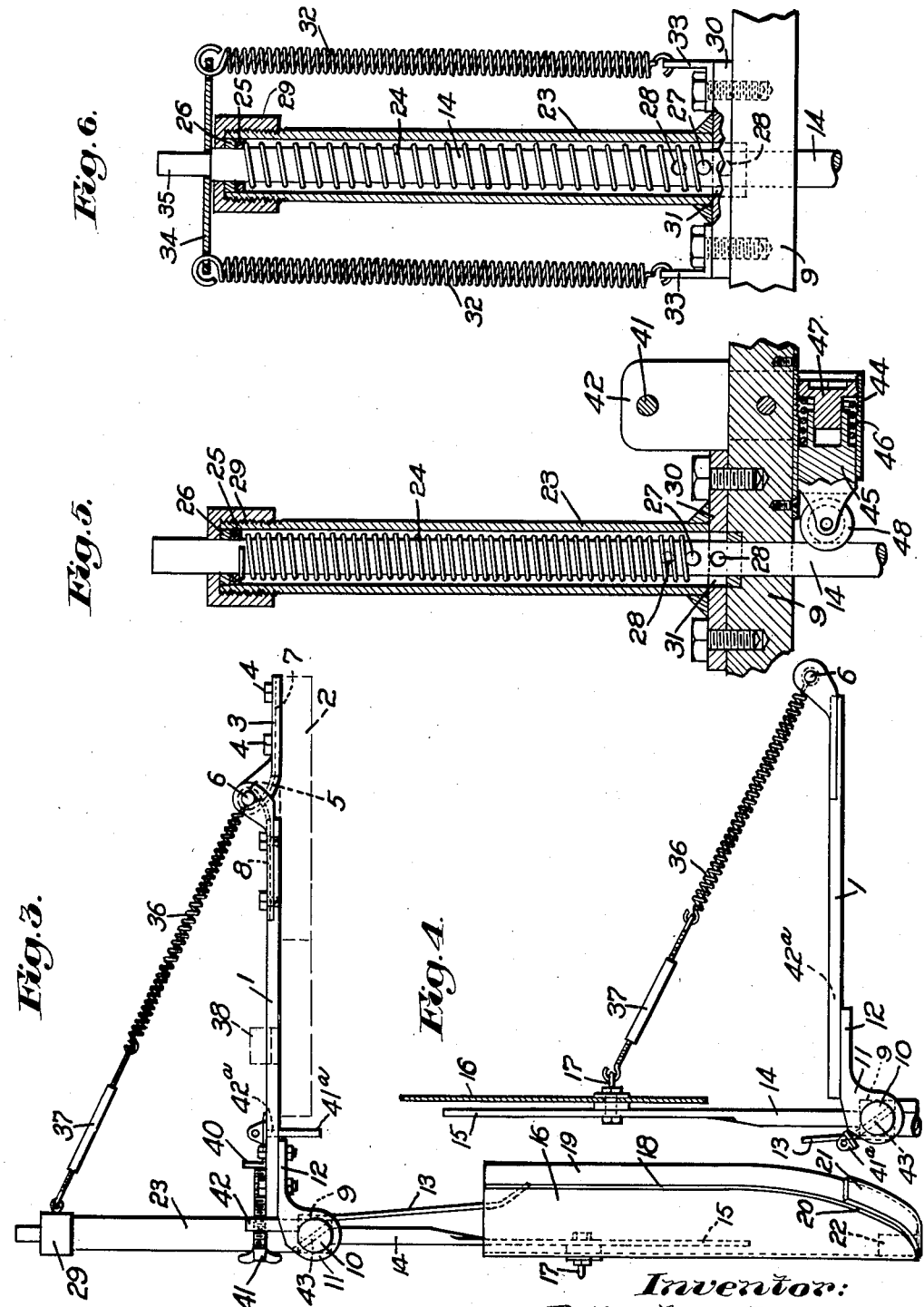
Inventor:
Robert A. Trueman.

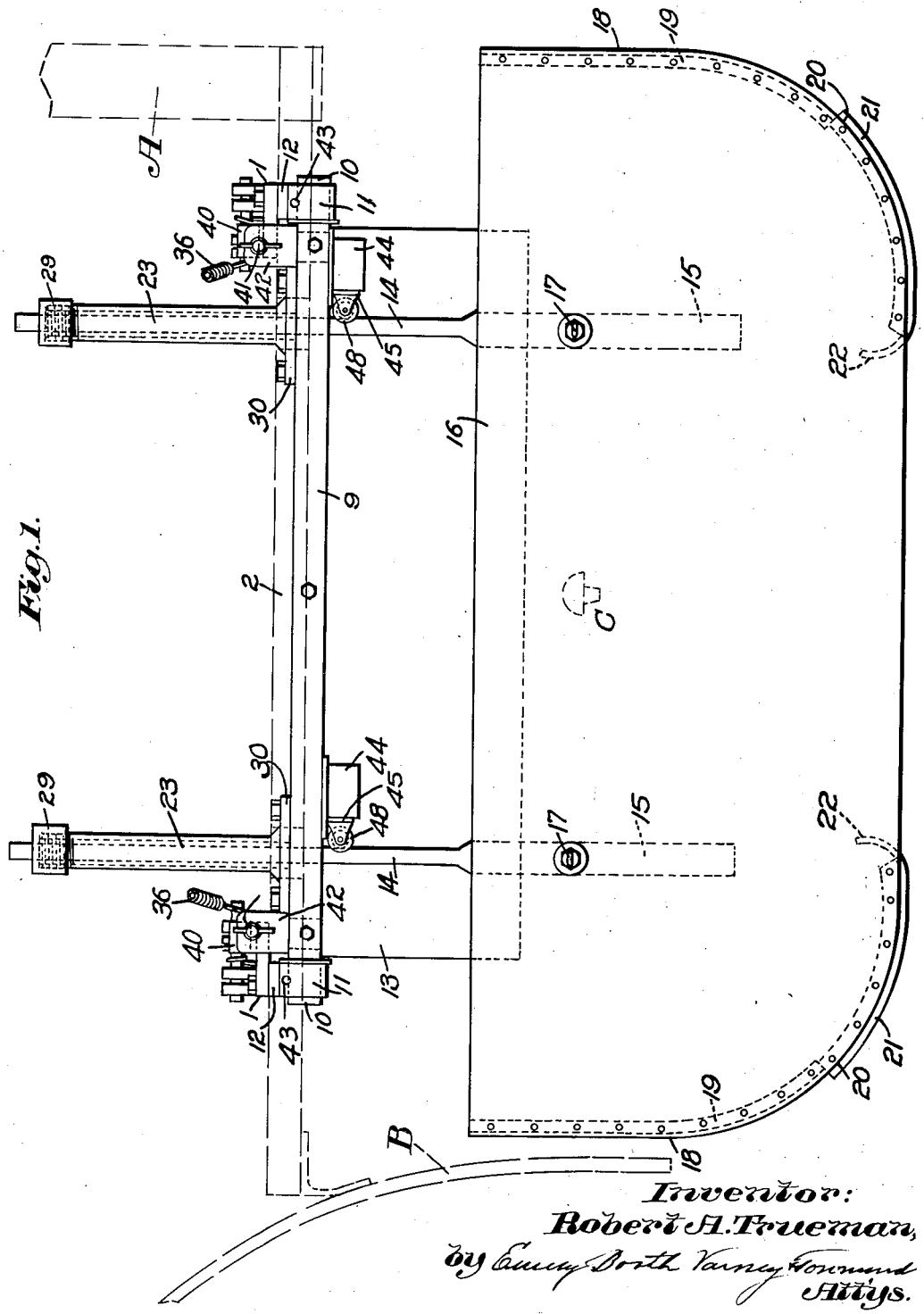

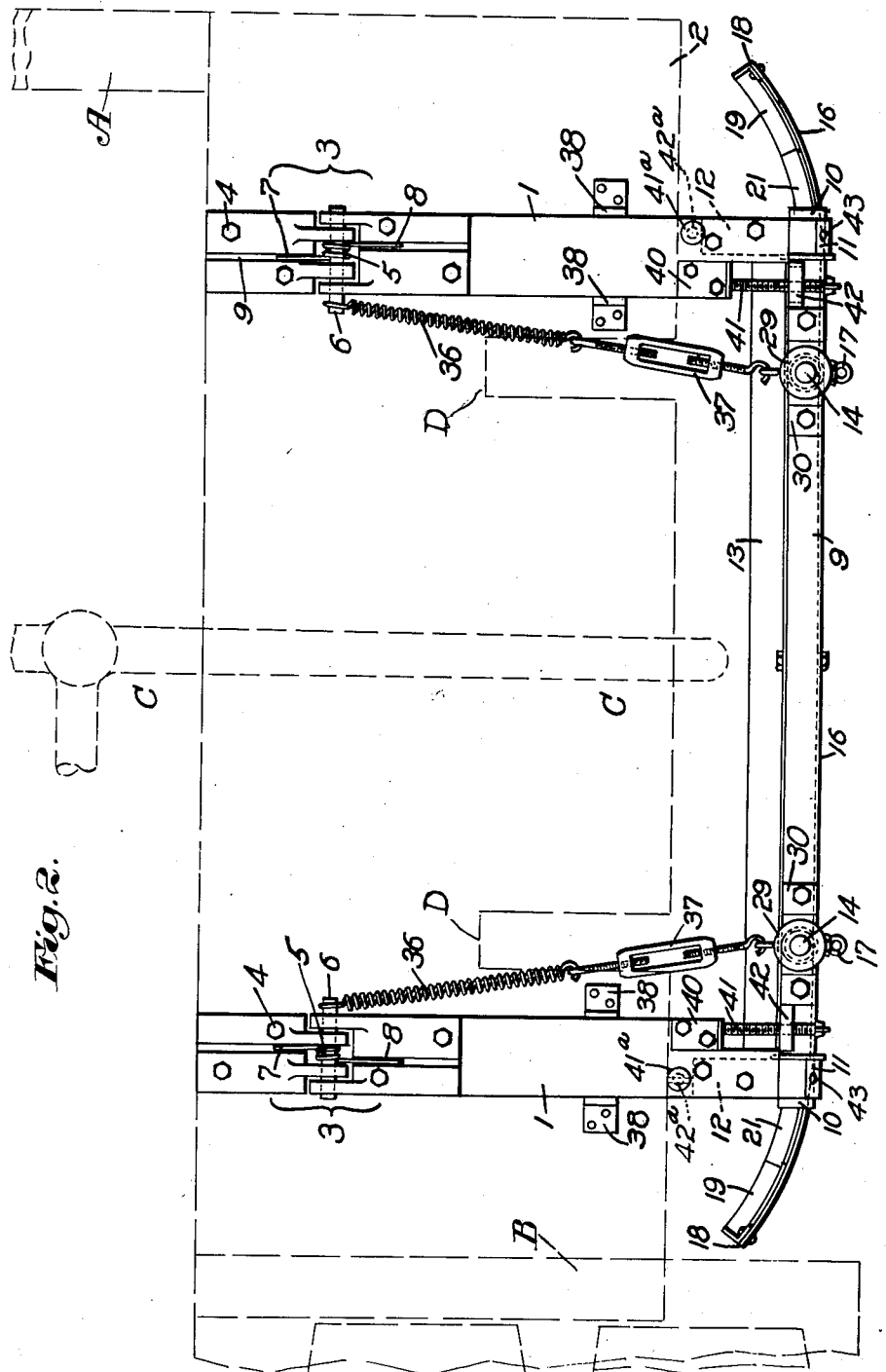

Patented Nov. 27, 1934

1,982,086

UNITED STATES PATENT OFFICE 1,982,086

NONSPLASH SPRAYING GUARD

Robert A. Trueman, Everett, Mass.

Application November 2, 1933, Serial No. 696,368

7 Claims. (Cl. 299—34)

This invention relates to non-splash shields for use on automobiles and other vehicles used for spraying road surfacing material, to prevent the accidental injury by the spraying to persons or property upon the sidewalk or other places adjacent to the vehicle; and my invention aims to provide a novel shield having, among others, the advantages hereafter described and illustrated.

In the drawings of one embodiment of my invention selected for description herein:—

Fig. 1 is a side view of the shield, as it appears in position upon a spraying vehicle, the platform of the latter being partly shown in dotted lines;

Fig. 2, a top edge view of the shield in position upon the vehicle;

Fig. 3, an end view of the shield in operative position, the platform of the vehicle being partly shown in dotted lines;

Fig. 4, a similar view of the shield in inoperative position and partly broken away; and Figs. 5 and 6, details, respectively, of the shield positioning spring construction showing adjustment thereof, parts being broken away.

My novel shield construction comprises, Figs. 2, 3, carrying members 1, in the form of bars of wood, or metal strips, which are positioned upon and overhang the rear edge of the operator's platform 2, dotted lines, of the vehicle at the rear end thereof. The platform is usually supported by conventional hangers A, dotted lines, of which one is shown. The shield is usually just behind the mudguard B, dotted lines, over the rear wheel. At their inner ends, these bars 1 carry hinges 3, the wings of which are secured to the platform 2, as by lag screws or bolts 4.

The hinge is provided with a hairpin or other suitable spring 5 coiled about the pin 6 of the hinge, the opposite legs 7, 8, of the spring resting against the wings, respectively, to act normally to keep the bars 1 down upon the platform 2 in operative position, but the hinge swings, if necessary, upwardly to accommodate the shield to be described to the road surface.

At their outer ends, these bars 1 overhang the platform and carry a shield positioning bar 9, the round ends 10 of which, Figs. 1, 3, are carried in the eyes 11 of plates 12 upon the lower face of the bars 1, so that the bar 9 may turn readily therein as in bearings. This bar carries a short fixed guard 13, depending therefrom.

Through the bar 9, Figs. 1, 2, and near its ends, extend vertically a number, herein two, of shield hanger rods 14, and to their flattened lower ends 15, dotted lines, Figs. 1, 3, is pivoted the shield member 16, of preferably sheet metal, by eye bolts 17 or other suitable means, the shield ends being curved laterally slightly. The lower end corners of the shield are rounded, and the end edges 18 have secured to them angle iron strips 19, which extend to the curved portion. Along the lower curved edge portion 20 the shield has secured to it a heavier angle iron strip 21, which overhangs the shield edge and contacts with the ground to take the wear resulting from such contact, the inner ends of each strip being curved upwardly as at 22, dotted lines Fig. 1, to glide smoothly over any raised portion of the road.

The upper ends of the rods 14 are received in a suitable yielding support as a spring-barrel 23, and encircled by suitable coiled springs 24, Figs. 1, 5, 6, the upper end of the spring being seated against a felt oil-impregnated washer 25 and a metal washer 26, while the lower end of the spring is seated upon a pin 27 extended through an aperture 28 in the rod 14. The lower end of the spring-barrel 23 carries also a felt-oil impregnated washer 25. The spring-barrel has threaded to its upper end a cap 29, through which the rod end 14 slides freely.

The springs 24 are designed to provide a sufficient yielding adjustment of the shield 16, as to height, to permit a material movement equal at least to the play of the body of the spraying vehicle from the loaded point to the empty point, relative to the road surface.

The hot spray material, as asphalt, tar, oil, etc., gives off much vapor, which, as it cools, becomes sticky and hard, and if allowed to collect and solidify on the springs 24, would soon coat them so effectively that they would not function properly.

To avoid this difficulty, I encase the springs in the barrels 23, and effectively close their ends by the lubricating washers 25 described. Obviously, the downwardly exerted pressure of the spring 24 can be increased or decreased at will by positioning the pin 27 in a different aperture, 28.

The barrel 23 is mounted upon a plate or base 30 which, in turn, is bolted to the bar 9, or otherwise secured thereon. The base 30 is slotted longitudinally at 31, Fig. 5, and dotted lines, Fig. 6, to facilitate the assembly of the parts. In assembling, the rod 14 is first thrust upward with the pin 27 therein registering lengthwise with the slot 31 through the base 30, after which the rod 14 is rotated 180° to position the pin 27 crosswise, as in Fig. 5, and the base 30 is then secured to the bar 9.

In Fig. 6 is shown a modified form of construction in which additional springs 32 are provided, their lower ends being engaged by angle irons 33, while their upper ends are secured by eyes in the ends of a yoke member 34, which is seated upon the squared end 35 of the rod 14. This construction provides a more sensitive spring action, which is sometimes preferred as each spring 24, 32, in this case is weaker than that shown in Fig. 5.

The angular position and adjustment of the shield 16 relative to the sidewalk or other line or area adjacent the spraying apparatus is controlled by springs 36 secured at their opposite ends to the caps 29 on the barrels 23, and the pins 6 in the hinges 3, the desired spring adjustment being secured by means of the turnbuckles 37. Posts or plates 38 at the opposite sides of the bar 1, on the platform, retain the bars 1 in perfect alignment with the hinges 3.

On the bars 1, angle irons 40 engage the inner ends of screws 41 threaded through bosses 42 on the bar 9, and these determine the extent of rotation of the bar, and also the angular adjustment of the shield 16 under the influence of the springs 36, which tend to swing the shield outwardly by turning the bar in the bearings 12. When in use, the shield 16 is normally in either upright position, as in Fig. 3, or slightly angular with the bottom edge swung outwardly, but when the vehicle is on the road en route to or from the area to be sprayed, it is more safe and convenient to swing the shield upside down as in Fig. 4. This is done by unhooking the springs 36 from the caps 29, removing the screws 41 from the rods 14 temporarily, then rotating the bar 9 and shield in the eyes 12 to the position of Fig. 4, the platform 2 being cut away at D to receive the barrels 23, Fig. 2, and securing the shield there, by withdrawing a pin 41a from the carrying socket 42a on the bar 1, Figs. 2, 3, and inserting it in the hole 43 in the end of bar 10 and walls of eyes 12, Fig. 3. The springs 36 may then be again secured to the eyes 17. While in this position, the weight of the shield is largely carried by the springs 24. If the form of spring construction shown in Fig. 6 is used, it is an advantage in such instances as the springs 32 lend additional supporting action. To that end, the springs 32 may be used, while the sprayer is travelling to the work, and then removed during the spraying period. The conventional construction and location of spraying bars is shown in dotted lines, Fig. 2, and indicated C for convenience.

When the spraying apparatus is in use and the vehicle proceeding forwardly, the lower edge of the shield 16 normally rests lightly upon the road surface, and this obviously will crate a certain amount of drag on the shield, which might make it difficult to adjust the shield in its bearings 11, as the conditions require.

As the shield is shown in Fig. 1, it is mounted upon the left-hand end of the platform at the rear of the vehicle which is proceeding to the left, Fig. 1. Any drag, then, if created, would tend to cause the shield to bear more heavily on the right-hand or rear side of the hinges 3 on the base 1, and the right-hand side of the spring-barrels 23 on the bar 9, and on the right-hand wall of the aperture through the member 9, in which the hanger 14 slides.

To neutralize this drag, therefore, I provide adjacent each hanger 14 a housing 44 secured beneath and to the bar 9. This housing has within it a plunger 45, pressed outwardly by a spring 46 seated against a plug 47 with threaded engagement in the housing end. The plunger's outer end carries a roller 48 against which rests the hanger 14.

Thus, with the proper adjustment of the spring pressure, the plunger will offset the drag on the shield 16 and insure true and easy movement thereof in its bearings 11.

In operation, the vehicle with the shield in inoperative position is driven to the work to be sprayed. It is customary to spray as near the sidewalk as possible, and the shield is mounted upon the vehicle platform accordingly.

The vehicle then moves forward with the shield sliding on the road surface, and the sidewalk and pedestrians on it are effectually protected by the shield from the spraying material. The yielding springs 24, Fig. 5, permit reasonable upward movement of the shield to accommodate uneven areas in the road surface. As the shield is loosely and pivotally connected to the hanger bars 14, as described, either end of the shield is adjustable vertically to a limited degree with but slight compensating movement by the opposite shield end. This permits necessary adjustment of the shield ends for such places as catch basins, etc., in road surfaces.

My novel, non-splash shield provides means with which a vehicle may be equipped at the loading plant, permitting the vehicle to travel to the place of use, with the shield in non-operative position, quickly adjustable for operation, and that will thus protect the particular area of curbstone and sidewalk likely to be injured by the spraying material during the spraying operation, as the vehicle progresses. This will do away with the present primitive method of covering the curbstone and adjacent sidewalk edge with building paper, section by section as the spraying vehicle progresses, anchoring the paper with stones, and then removing the paper and carrying it ahead of the vehicle, and again applying it to the sidewalk, which requires the attention and time of several men in addition to the operator of the vehicle, entailing much expense both for material and time.

My invention is not limited to the precise embodiment thereof disclosed and claimed herein.

I claim:

1. A splash-preventing spray shielding unit comprising a shield, carrying bars for the shield to engage the vehicle, a shield positioning bar, and means whereby the shield is movably carried by the carrying bars; said means including spring barrels on the positioning bar with springs therein, shield supporting hanger rods so associated with the springs as to cause the shield to ride yieldingly on the street surface and support the shield when inverted by rotation of the positioning bar.

2. A splash-preventing spray shielding unit comprising a shield, carrying bars for the shield to engage the vehicle, a shield positioning bar, and means whereby the shield is yieldably and rotatively carried by the carrying bars; said means including spring barrels on the positioning bar with springs therein, shield-supporting hanger rods so associated with the springs as to cause the shield to ride yieldingly over the street surface, and adjustable spring means on the barrels and carrying bars so mounted as to turn the positioning bar relative to the carrying bars and swing the shield angularly to desired position, and means on the carrying bars and positioning bars for limiting rotation of the shield.

3. A splash-preventing spray shielding unit comprising a shield, adjustable carrying bars for the shield to engage the vehicle, a shield positioning bar with the shield thereon, and means whereby the shield is yieldably and rotatively carried by the carrying bars, said means including supporting members on the positioning bar with yielding members adjustably seated therein, hanger rods on the shield carried by the yielding members, yielding members also on the supporting members and the carrying bars so mounted as to swing the shield angularly for use and also to retain the shield in inoperative position when not in use.

4. A splash-preventing spray shielding unit comprising a shield; carrying bars for the shield to engage the vehicle; a shield positioning bar; and means whereby the shield is yieldingly mounted relative to the road on the carrying bars, said means including springs on the positioning bar, hanger members on the shield passing through the positioning bar and engaging said springs; and a drag neutralizing member comprising a housing on the positioning bar, a spring-pressed plunger adjustably mounted in the housing and bearing on the shield hanger bar to oppose any drag created by the friction of the shield on the road.

5. A splash-preventing spray shielding unit comprising a shield; adjustable carrying bars for the shield to engage the vehicle; a shield positioning bar movable on the carrying bars and permitting reversal of position of the shield; and means including a housing on the positioning bar with a spring therein, a hanger bar carried by the spring and engaging the shield to impart yielding support to the shield; a fixed guard on the positioning bar, spring means so mounted on a carrying bar and the housing as to swing the shield to angular position and also to engage the shield to hold it in inoperative position if desired.

6. A splash-preventing, spray shielding unit comprising a shield, pivoted carrying bars for the shield to engage the vehicle, a shield positioning bar therefor rotatively mounted in the carrying bars permitting reversal of position of the shield; and means including a spring barrel on the positioning bar with a spring therein, a hanger bar supporting said shield and carried by the hanger bar and engaging the positioning bar to impart yielding support to the shield; and means on a carrying bar to engage and secure the shield when inverted.

7. A splash preventing spray shielding unit comprising means including bars for attaching it to a vehicle, a shield member, and positioning bar therefor rotatably mounted on said means for angularly adjusting the position of the shield member relative to the vehicle, means on the unit to hold the shield yieldingly in such adjusted position, and yielding, supporting means carrying the shield on the positioning bar and acting substantially vertically relative to the vehicle.

ROBERT A. TRUEMAN.